United States Patent [19]
Nolle

[11] Patent Number: 5,422,530
[45] Date of Patent: Jun. 6, 1995

[54] STATOR FOR INDUCTION MOTORS

[75] Inventor: Eugen Nolle, Sersheim, Germany

[73] Assignee: Blum GmbH, Vaihingen/Enz, Germany

[21] Appl. No.: 233,218

[22] Filed: Apr. 26, 1994

Related U.S. Application Data

[63] Continuation of Ser. No. 990,598, Dec. 14, 1992, abandoned.

[30] Foreign Application Priority Data

Dec. 16, 1991 [DE]  Germany ............................ 4141477

[51] Int. Cl.⁶ .............................................. H02K 1/22
[52] U.S. Cl. ...................................... 310/257; 310/42; 310/218; 310/259
[58] Field of Search ................ 310/216, 217, 218, 42, 310/12, 254, 257, 259, 166, 187, 188; 29/596

[56] References Cited

U.S. PATENT DOCUMENTS

| | | | |
|---|---|---|---|
| 3,445,702 | 5/1969 | Silva | 310/218 |
| 4,149,309 | 4/1979 | Mitsui | 310/218 |
| 4,156,168 | 5/1979 | Vogel | 310/218 |
| 4,563,606 | 1/1986 | Fukasawa | 310/179 |
| 4,788,465 | 11/1988 | Hertrich | 310/216 |
| 5,349,742 | 9/1994 | Nolle | 29/598 |

FOREIGN PATENT DOCUMENTS 0982508  6/1951  France ................................ 310/218

Primary Examiner—R. Skudy
Attorney, Agent, or Firm—Darby & Darby

[57] ABSTRACT

A stator for use in induction motors has a laminated core at least one side of which is provided with recesses of constant width for reception of the wires of stator coils. The partitions between the recesses have sockets for the plugs of separately produced inserts which have lateral extensions partially overlying the neighboring recesses to retain the wires in the innermost portions of such recesses. The plugs and the partitions have complementary detents which secure the inserts to the respective partitions. The partitions undergo elastic deformation during introduction of plugs into the respective sockets.

23 Claims, 1 Drawing Sheet

STATOR FOR INDUCTION MOTORS

This is a continuation of application Ser. No. 07/990,598, filed Dec. 14, 1992, now is abandoned.

BACKGROUND OF THE INVENTION

The invention relates to stators for electric motors, and more particularly to improvements in stators for induction motors, especially linear induction motors. Such stators can be utilized in overhead rails of magnetic railroads.

The invention also relates to improvements in laminations which can be utilized in the stators of induction motors.

OBJECTS OF THE INVENTION

An object of the invention is to provide a stator which can be used in induction motors and can be mass produced at a reasonable cost.

Another object of the invention is to provide a stator wherein the core can be assembled with stator coils in a simple and time-saving manner.

A further object of the invention is to provide a novel and improved core for use in a stator of the above outlined character.

An additional object of the invention is to provide a novel and improved composite core for use in the stator of a linear induction motor.

Still another object of the invention is to provide a novel and improved combination of composite core and stator coils for use in a stator for induction motors.

A further object of the invention is to provide novel and improved laminations for use in the above outlined core.

Another object of the invention is to provide a stator wherein the coils are less likely to be damaged during insertion into the recesses of the core than in heretofore known stators.

An additional object of the invention is to provide a novel and improved method of assembling the above outlined stator.

Still another object of the invention is to provide an electric motor which embodies a stator of the above outlined characteristics.

A further object of the invention is to provide a novel and improved method of confining the wires of stator coils in the recesses of a core forming part of a stator for use in an electric motor.

Another object of the invention is to provide a stator which constitutes an improvement over and a further development of stators disclosed in the commonly owned patent application Ser. No. 07/937,354, filed Aug. 27, 1992, now U.S. Pat. No. 5,349,742, for "Secondary for use in induction-motors and method of making the same".

An additional object of the invention is to provide a stator whose core can be assembled of mass-produced components at a reasonable cost.

SUMMARY OF THE INVENTION

One feature of the present invention resides in the provision of a stator for use in induction motors. The improved stator comprises a laminated core having a side provided with plurality of recesses for preferably prefabricated stator coils and partitions alternating with the recesses so that each partition is flanked by two neighboring recesses, and inserts which are carried by the partitions and each of which has at least one lateral extension partially overlapping a neighboring recess. The inserts and the partitions respectively comprise complementary first and second coupling devices which secure the inserts to the core. In accordance with a presently preferred embodiment, the second coupling devices include sockets in the partitions and the first coupling devices include plugs which are lockingly received in the respective sockets. The plugs and the sockets have complementary first and second detents which lock the plugs in the respective sockets. The arrangement can be such that the first detents are male detents and the second detents are complementary female detents.

Each plug can comprise two aligned sections and each such section preferably tapers in a direction from the side of the core toward an innermost portion of the respective socket (namely a portion remotest from the side of the core). The male detents are disposed between the aligned sections of the respective plugs, and each socket can have two aligned portions or compartments for the sections of the respective plug. The female detents are then disposed between the compartments of the respective sockets. The male detents can include shoulders on the plugs, and the female detents can include undercut portions of the partitions. At least one section of each plug and at least one compartment of each socket can have a substantially V-shaped cross-sectional outline, i.e., such sections and such compartments can resemble wedges. One compartment of each socket can extend to the innermost portion of such socket.

The laminations of the core can constitute stampings. Alternatively, or in addition to such construction of the core, each insert can constitute a stamping; for example, each insert can constitute a prefabricated package of laminations each of which is a stamping.

Another feature of the invention resides in the provision of a lamination which can be used in the core of a stator for induction motors of the type having inserts each of which includes at least one lateral extension in the form of a rib, lug or the like and a first coupling device. The lamination comprises a plate or panel having a side or edge face provided with a plurality of recesses for stator coils and partitions alternating with the recesses so that each partition is flanked by two neighboring recesses. The partitions have second coupling devices each serving to lockingly engage the first coupling device of an insert whereby the lateral extension of the thus engaged insert partially overlies one of the neighboring recesses.

Each insert can have a plug-shaped (first) coupling device which is provided with a first detent (e.g., a male detent), and the second coupling devices then constitute sockets for the plug-shaped first coupling devices. The partitions of such panel further comprise second detents which are engageable by the (first) detents of the plug-shaped coupling devices.

The (first) coupling device of each insert can be composed of or can include two aligned sections which taper in a direction away from the respective at least one lateral extension. The first detents are disposed between the respective aligned sections, and the socket of each partition then includes two portions or compartments for the aligned sections of a first coupling device. Each partition then further includes at least one undercut portion which is disposed between the respective compartments and constitutes or forms part of the respective second detent. If at least one section of each plug-shaped first coupling device resembles a wedge, at least one compartment of each socket preferably also resembles a wedge, i.e., it has a substantially V-shaped cross-sectional outline. One compartment of each socket preferably communicates with the innermost or deepmost portion of the respective socket; such innermost portions can constitute holes or bores having substantially circular cross-sectional outlines.

The plate can constitute a stamping, the same as the inserts.

The novel features which are considered as characteristic of the invention are set forth in particular in the appended claims. The improved stator itself, however, both as to its construction and the mode of assembling the same, together with additional features and advantages thereof, will be best understood upon perusal of the following detailed description of certain presently preferred specific embodiments with reference to the accompanying drawings.

DESCRIPTION OF THE PREFERRED EMBODIMENTS

Figure 4:
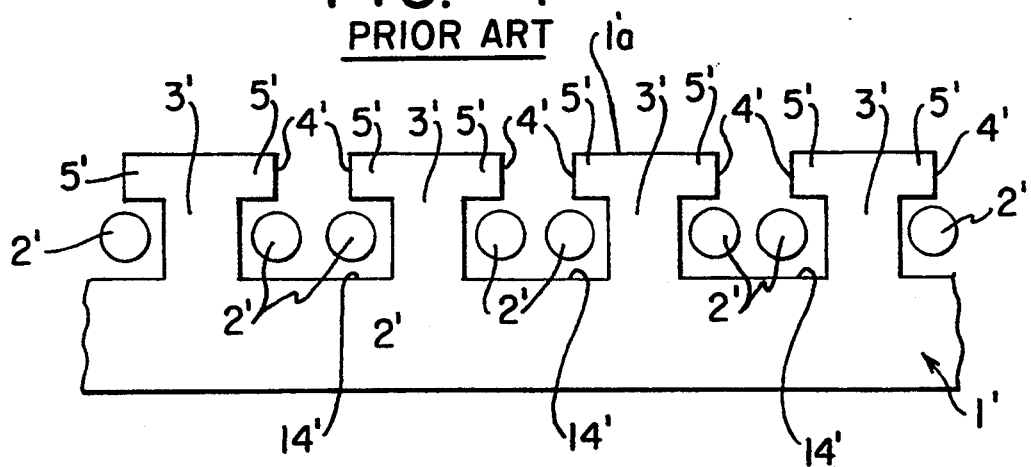
FIG. 4 is a fragmentary elevational view of a conventional stator.

Referring first to FIG. 4, there is shown a portion of a conventional stator which can be used in induction motors and comprises a laminated core 1' and stator coils or field windings 2'. The upper side 1a' (as viewed in FIG. 4) of the core 1' is provided with a set of recesses 14' alternating with partitions 3' each of which has two laterally projecting extensions 5' overlying portions of the neighboring recesses 14'. This establishes relatively narrow slots 4' each of which is bounded by two extensions 5'. The wider inner portions of the recesses 14' receive the wires of the stator coils 2'. Such coils are prefabricated of solid wires having relatively large diameters, and it is necessary to manually bend such wires at the locus of assembly preparatory to insertion through the narrow slots 4' leading into the wider inner portions of the respective recesses 14'. The wires must be straightened out subsequent to introduction into the wider portions of the recesses 14'. All this takes up much time and the wires of the stator coils 2' are likely to be damaged preparatory to, during and subsequent to introduction into the wider portions of the recesses 14'. If the just described conventional stator is used in a magnetic railroad system, damage to a core winding 2' can render it necessary to discard a stator having a length of up to 30 meters with attendant huge losses in material, man hours and profits.

Figure 1:
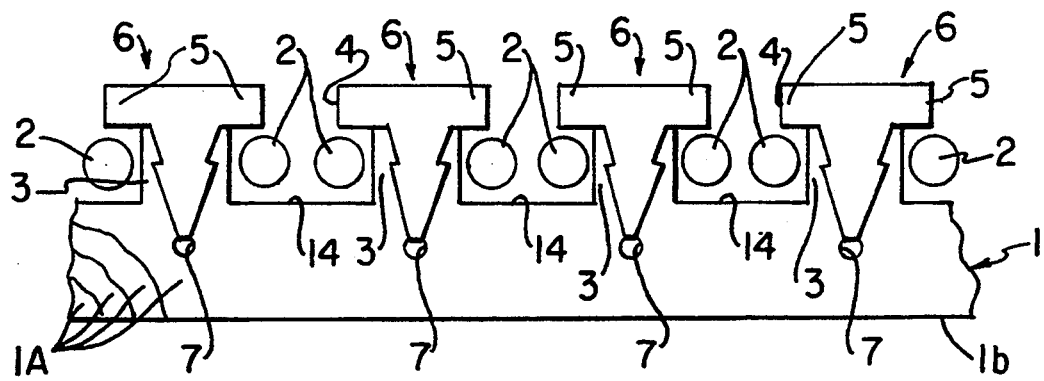
FIG. 1 is a fragmentary elevational view of a stator which embodies one form of the invention.
Figure 2:
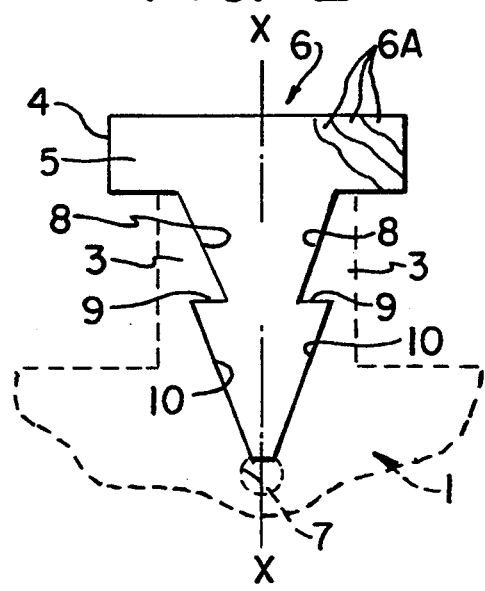
FIG. 2 is an enlarged view of one of the inserts, with the adjacent portion of the core of the stator indicated by broken lines.
Figure 3:
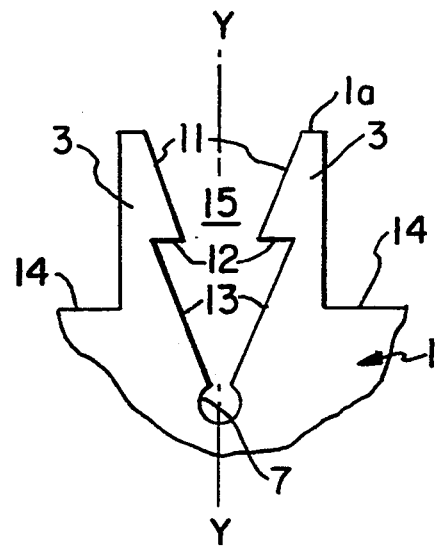
FIG. 3 is an enlarged view of a partition in the core of the stator which is shown in FIG. 1.

FIG. 1 shows a portion of a stator which embodies one form of the invention. The stator comprises a core 1 which is assembled of stacked plate-like laminations 1A and has a smooth side 1b and a second side 1a (FIG. 3) provided with elongated recesses or cutouts 14 which alternate with partitions 3, i.e., each partition 3 is flanked by the two neighboring recesses 14. Each recess 14 has a constant width all the way from the side 1a to its deepmost portion (nearest to the side 1b). The reference characters 2 denote the wires of stator coils which are received in the inner portions of the recesses 14 and can be readily introduced into such recesses because the partitions 3 of the core 1 are not of one piece with lateral extensions corresponding to those shown at 5' in FIG. 4. Instead, the stator of FIG. 1 further comprises a separately produced insert 6 for each partition 3, and each such insert is reliably coupled to the respective partition. As can be seen in FIGS. 2 and 3, each insert 6 (which is preferably assembled of laminations 6A constituting stampings, the same as the plate-like laminations 1A of the core 1) has a plug-shaped male coupling device or plug 16 which is snugly received in a complementary second or female coupling device in the form of a socket 15 provided in the respective partition 3 and extending from the side 1a toward but short of the side 1b.

Each insert 6 has two lateral extensions 5 which partially overlie the open sides of the neighboring recesses 14 when the plug 16 of such insert is properly received in the respective socket 15. The extensions 5 of neighboring inserts 6 then define relatively narrow slots 4 leading to the inner portions of the respective recesses 14.

The plug or coupling device 16 of each of the illustrated inserts 6 includes two sections 8, 10 which are aligned with each other in a direction from the side 1a of the core 1 toward the innermost or deepmost portion 7 of the respective socket 15. The sections 8 and 10 are V-shaped, i.e., they resemble wedges which taper in a direction from the side 1a toward the respective innermost portion 7, and each plug 16 further comprises a first or male detent 9 consisting of shoulders 9 which are at least substantially parallel to the side 1a and are disposed between the respective wedge-shaped sections 8 and 10.

Each socket 15 includes a wedge-like first or outer portion or compartment 11 and a similar second or inner portion or compartment 13 in communication with the innermost portion 7. Each partition 3 further comprises a second or female detent including two undercut portions 12 which are disposed between the respective compartments 11 and 13. The compartments 11 of the sockets 15 can snugly receive the sections 8 of the respective plugs 16, and the compartments 13 of the sockets 15 can snugly receive the sections 10 of the respective plugs 16 (see FIG. 1). When the sections 8, 10 are snugly received in the respective compartments 11 and 13, the shoulders 9 of the thus properly inserted plug 16 abut the undercut portions or detents 12 of the respective partition 3 to ensure reliable retention of inserts 6 in the respective partitions 3 and proper positioning of lateral extensions 5 relative to the wires in the innermost portions of the neighboring recesses 14.

The partitions 3 undergo requisite deformation during introduction of the plugs 16 into their sockets 15, and the partitions 3 thereupon reassume their original shape with the result that the inserts 6 are properly coupled to the core 1. The provision of a round or substantially round hole- or bore-like innermost portion 7 in each partition 3 contributes to ready deformability of the partition during coupling of an insert 6 thereto. Moreover, it is difficult to make in a stamping machine laminations with pointed ends of cutouts, such as the sockets 15 without round hole- or bore-like portions 7.

As mentioned above, the core 1 is a package of plate-like laminations 1A which are assembled in any well known manner and each of which can constitute a stamping. The same applies for the laminations, panels or plates 6A of the inserts 6, i.e., each such lamination 6A can constitute a stamping having two substantially wedge-like sections with shoulders, between the two sections.

An important advantage of the improved stator is that the provision of separately produced inserts 6 or their equivalents renders it possible to fully assemble the stator at the manufacturing plant at a greatly reduced cost and in a fully automatic way. This is due to the fact that the wires of the stator coils 2 are readily insertable into the inner portions of the recesses 14 prior to attachment of the inserts 6 to the respective partitions 3. The first step can include the assembly of the laminations 1A into a core 1 and proper fastening of the core in a desired position. The prefabricated stator coils 2 are then assembled with the core 1, and the preferably prefabricated inserts 6 are then coupled to the respective partitions 3 to complete the assembly of a stator of the type shown in FIGS. 1 to 3. The aforediscussed detents 9, 12 and/or their equivalents ensure reliable retention of inserts 6 in optimum positions relative to the core 1 and equally reliable retention of wires of the stator coil 2 in the inner portions of the recesses 14. Thus, it is not necessary to select the width of the slots 4 in such a way that these slots should be wide enough for passage of wires of the stator coils 2 therethrough.

An advantage of substantially circular hole- or borelike innermost portions 7 of the sockets 15 is that they facilitate convenient making of the laminations 1A in a suitable stamping machine. As already mentioned hereinbefore, the illustrated innermost portions 7 are desirable on the additional ground that they permit convenient spreading of the sockets 15 for introduction of the plugs 16, i.e., the innermost portions 7 enhance the elasticity of the partitions 3.

Each of the illustrated inserts 6 has a central symmetry plane X—X which is normal to the common plane of the respective shoulders 9. The same holds true for the common plane of a pair of neighboring undercut portions 12 and the central symmetry plane Y—Y of the respective socket 15.

The laminations 1A of the core 1 can be secured to each other by rivets, by resorting to the so-called stamping-packaging technique, by soldering or by welding. Reference may be had to aforementioned commonly owned patent application Ser. No. 07/937,354, now U.S. Pat. No. 5,349,742.

It is also possible to form-lockingly connect the inserts 6 to the respective partitions 3 upon introduction of the plugs 16 or their equivalents into the respective sockets 15 or into the equivalents of such sockets. However, the provision of complementary detents (such as 9 and 12) right on the inserts and on the partitions prior to assembly of such sockets with the respective-partitions is preferred at this time because the detents ensure that the inserts are automatically locked to the partitions as soon as their attachment to the core 1 is completed.

The V-shaped or wedge-like sections 8, 10 of the plugs 16 and the complementary compartments 11, 13 of the sockets 15 exhibit the advantage that they contribute to simplicity of insertion of plugs into the respective sockets.

The improved stator is susceptible of numerous additional modifications without departing from the spirit of the invention. For example, the illustrated detents 9 and 12 can be replaced with other types of complementary detents as long as the selected detents ensure reliable retention of the plugs 16 or of equivalents of such plugs in the sockets of the respective partitions 3. It is also possible to provide complementary male and female detents between the lateral extensions 5 and the adjacent portions of the core 1. It is presently preferred to provide male or female detents on those parts (such as the plugs 16) of the inserts 6 which extend into the sockets 15 or into analogous sockets, and to provide complementary female or male detents on the partitions 3 to engage or to be engaged by the detents of the inserts. Furthermore, the illustrated detents 9, 12 can be provided in addition to complementary detents between the side 1a of the core 1 and the adjacent portions of the lateral extensions 5.

The core 1 of the improved stator is a so-called onesided or single-comb core. However, it is equally within the purview of the invention to provide additional recesses 14 in the other side 1b of the illustrated core 1 and to employ a second set of stator coils and additional inserts in order to secure the second set of stator coils in the recesses of the side 1b. The thus modified core would constitute a so-called twin-comb or two-sided core Reference may be had again to the commonly owned copending patent application Ser. No. 07/937,354, now U.S. Pat. No. 5,349,742.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A stator for an induction motor, comprising:
a laminated core having a first surface with a plurality of recesses therein, said recesses extending in a first direction toward a second surface of said core, partitions alternating with and separating said recesses, each partition being flanked by two neighboring recesses;
a plurality of inserts, at least a portion of said partitions carrying one of said inserts, each of said inserts including at least one extension partially overlying a neighboring recess,
each of said inserts including a complementary first coupling device and each of said partitions including a second coupling device, interengagement of said first and second coupling devices securing said inserts to said core, said coupling devices being dimensioned to interengage when said inserts and partitions are forced together in said first direction.

2. The stator of claim 1, wherein-said second coupling devices include sockets in said partitions and said first coupling devices include plugs lockingly received in respective sockets.

3. The stator of claim 2, wherein said plugs and said sockets have complementary first and second detents which lock said plugs in said respective sockets.

4. The stator of claim 3, wherein said first detents are male detents and said second detents are female detents.

5. The stator of claim 4, wherein each of said sockets has an innermost portion remote from said first surface of said core and each of said plugs includes two aligned sections each of which tapers in a direction from said first surface of said core toward the innermost portion of the sockets and said male detents being disposed between the aligned sections of the plugs, each of said sockets having two aligned compartments for the sections of the plugs and said female detents being disposed between the compartments of the sockets.

6. The stator of claim 5, wherein said male detents include shoulders on said plugs and said female detents include undercut portions of said partitions.

7. The stator of claim 5, wherein at least one section of each of said plugs and at least one compartment of each of said sockets has a substantially V-shaped cross-sectional outline.

8. The stator of claim 5, wherein one compartment of each of said sockets extends to the innermost portion of the sockets.

9. The stator of claim 1, wherein said core has laminations which constitute stampings.

10. The stator of claim 1, wherein said inserts are stampings.

11. The stator of claim 1, wherein at least one of said inserts is a prefabricated package of laminations.

12. A lamination for use in a core of a stator for an induction motor of the type having inserts, each of said inserts including a first coupling device having at least one extension, said lamination comprising:
 a plate having a first edge provided with a plurality of recesses therein for stator coils and partitions alternating with said recesses so that each said partition is flanked by two neighboring recesses, said recesses extending in a first direction toward a second edge of said plate;
 second coupling devices for at least a portion of said partitions, each of said second coupling devices being arranged to lockingly engage said first coupling device of an insert, the at least one extension of said insert partially overlying one of said neighboring recesses; and
 said partitions being dimensioned to become interengaged with said inserts respectively when said inserts and partitions are forced together in said first direction.

13. The lamination of claim 12 wherein said inserts include plug-shaped first coupling devices having first detents, and wherein said second coupling devices include sockets for the plug shaped first coupling devices and said partitions further have second detents engageable by the first detents of the first coupling devices.

14. The lamination of claim 12, wherein each said first coupling device includes two aligned tapering sections, a first detent being disposed between said two aligned tapering sections of said first coupling device, each of said partitions having two aligned tapering sections forming a socket with at least one undercut portion constituting a second detent, the tapering sections of said partition receiving the tapering sections of said first coupling device.

15. The lamination of claim 14 wherein at least one of said tapering sections of the first coupling device has a substantially V-shaped cross-sectional outline, and wherein said socket in each of said partitions has a compartment of substantially V-shaped cross-sectional outline for receiving said at least one section therein.

16. The lamination of claim 15, wherein each of said sockets has an innermost portion remote from said first edge of said plate and communicating with said compartment.

17. The lamination of claim 16, wherein said innermost portion of each of said sockets is a hole having a substantially circular cross-sectional outline.

18. The lamination of claim 12, wherein said plate is a stamping.

19. The lamination of claim 12 wherein said inserts comprise stampings.

20. A stator as in claim 1; wherein said partitions include at least one portion yielding elastically when said associated insert is forced to engage said partition in said first direction.

21. A lamination as in claim 12, wherein said partitions include at least one portion being elastically yieldable when an insert is forced in said first direction into engagement in said at least one portion.

22. A lamination for use in a core of a stator for induction motors comprising:
 inserts, each insert including at least one lateral extension and a first coupling device;
 a plate having a side provided with a plurality of recesses for stator coils, and partitions alternating with said recesses so that each partition is flanked by two neighboring recesses, said partitions having second coupling devices each arranged in sockets to lockingly engage the first coupling device of an insert, whereby the lateral extension of said insert partially overlies one of the neighboring recesses;
 said first coupling devices each including two aligned sections tapering in a direction away from the lateral extension of said insert;
 a first detent being disposed between the aligned sections, each of said sockets having two aligned compartments for receiving the sections of one of said first coupling device, each of said sockets having at least one undercut portion disposed between the compartments and constituting a second detent; and
 at least one said section of said first coupling device having a substantially V-shaped cross-sectional outline and at least one said compartment of the socket having a substantially V-shaped cross-sectional outline.

23. A stator for an induction motor, comprising:
 a laminated core having a first surface with a plurality of recesses therein, said recesses extending in a first direction toward a second surface of said core, partitions alternating with and separating said recesses, each partition being flanked by two neighboring recesses;
 a plurality of inserts, at least a portion of said partitions carrying one of said inserts, each of said inserts including at least one extension partially overlying a neighboring recess,
 each of said inserts including a complementary first coupling device and each of said partitions including a second coupling device, said first and second coupling devices having complementary tapering sections for interengagement of said first and second coupling devices to secure said inserts to said core, said tapering sections tapering in the first direction when they are interengaged, said coupling devices being to interengaged when said inserts and partitions are forced together in said first direction.

* * * * *